(12) United States Patent
Kim et al.

(10) Patent No.: US 11,360,207 B2
(45) Date of Patent: Jun. 14, 2022

(54) APPARATUS AND METHOD FOR TRACKING OBJECT BASED ON RADAR IMAGE RECONSTRUCTION

(71) Applicants: Ewha University—Industry Collaboration Foundation, Seoul (KR); TOP CENTRAL R & D CENTER, Seongnam-si (KR)

(72) Inventors: Jeong Tae Kim, Seoul (KR); Tae Hyeong Ha, Seoul (KR)

(73) Assignees: Ewha University—Industry Collaboration Foundation, Seoul (KR); TOP CENTRAL R&D CENTER, Seongnam-si (KR)

( * ) Notice: Subject to any disclaimer, the term of this patent is extended or adjusted under 35 U.S.C. 154(b) by 233 days.

(21) Appl. No.: 16/699,561

(22) Filed: Nov. 30, 2019

(65) Prior Publication Data
US 2020/0256974 A1   Aug. 13, 2020

(30) Foreign Application Priority Data
Nov. 30, 2018   (KR) .................. 10-2018-0152683

(51) Int. Cl.
*G01S 13/72*   (2006.01)
*G01S 7/282*   (2006.01)
*G01S 13/89*   (2006.01)
*G01S 13/00*   (2006.01)

(52) U.S. Cl.
CPC ............. *G01S 13/72* (2013.01); *G01S 7/282* (2013.01); *G01S 13/89* (2013.01); *G01S 13/003* (2013.01); *G06T 2207/10044* (2013.01)

(58) Field of Classification Search
CPC .... G01S 13/89; G01S 13/003; G01S 13/9064; G06T 2207/10044
USPC .................................................. 342/59, 179
See application file for complete search history.

(56) References Cited

U.S. PATENT DOCUMENTS

| 4,546,354 A * | 10/1985 | Boles ............... G01S 13/66 342/25 C |
| 7,639,171 B2 * | 12/2009 | Alland ............... H01Q 3/24 342/25 R |
| 7,642,953 B2 * | 1/2010 | Cheng ............... G01S 7/003 342/179 |

(Continued)

FOREIGN PATENT DOCUMENTS

| KR | 10-1149800 B1 | 6/2012 |
| KR | 10-2017-0115257 A1 | 10/2017 |

OTHER PUBLICATIONS

Office Action dated Mar. 25, 2020 from Korean Intellectual Property Office.

*Primary Examiner* — Erin F Heard
*Assistant Examiner* — Michael W Justice

(57) ABSTRACT

Disclosed is an apparatus for tracking an object based on radar image reconstruction, the apparatus including a two-dimensional image producing unit configured to produce a two-dimensional image by collecting multiple one-dimensional radar signals from which clutter is removed, an object detecting unit configured to determine the presence or absence of an object from the two-dimensional image and estimate a two-dimensional position of the present object, and an object tracking unit configured to track a movement path of the object based on the two-dimensional position estimated by the object detecting unit.

8 Claims, 4 Drawing Sheets

(56) References Cited

U.S. PATENT DOCUMENTS

| | | | |
|---|---|---|---|
| 9,086,501 B2* | 7/2015 | Beer | G01S 7/024 |
| 9,870,641 B2* | 1/2018 | Anderson | G01S 13/885 |
| 10,037,671 B2* | 7/2018 | Zack | G08B 21/043 |
| 10,371,808 B2* | 8/2019 | Honma | G01S 13/42 |
| 10,621,847 B2* | 4/2020 | Zack | G01S 13/0209 |
| 10,663,573 B2* | 5/2020 | Honma | G01S 13/003 |
| 10,677,915 B2* | 6/2020 | Mansour | G01S 7/40 |
| 2009/0021423 A1* | 1/2009 | Cheng | G01S 7/003 342/25 A |
| 2009/0085800 A1* | 4/2009 | Alland | G01S 13/343 342/25 R |
| 2012/0274499 A1* | 11/2012 | Chang | G01S 7/42 342/107 |
| 2014/0176714 A1* | 6/2014 | Li | G08G 1/166 348/148 |
| 2014/0226850 A1* | 8/2014 | Beer | G01S 7/295 382/103 |
| 2016/0379462 A1* | 12/2016 | Zack | G01S 7/411 340/539.12 |
| 2017/0205502 A1* | 7/2017 | Honma | G01S 13/42 |
| 2018/0330593 A1* | 11/2018 | Zack | G08B 21/0453 |
| 2019/0242991 A1* | 8/2019 | Mansour | G01S 13/9019 |
| 2019/0346546 A1* | 11/2019 | Honma | G01S 7/415 |
| 2020/0233074 A1* | 7/2020 | Honma | G01S 7/354 |

\* cited by examiner

APPARATUS AND METHOD FOR TRACKING OBJECT BASED ON RADAR IMAGE RECONSTRUCTION

CROSS-REFERENCE TO RELATED APPLICATIONS

This application claims priority to and the benefit of Korean Patent Application No. 10-2018-0152683 filed in the Korean Intellectual Property Office on Nov. 30, 2018, the entire contents of which are incorporated herein by reference.

TECHNICAL FIELD

The present invention relates to a radar technology, and particularly, to a technology for tracking an object by using a multi-mode radar system.

BACKGROUND ART

A radar technology refers to a sensor technology that uses straightness of radio waves and detects reflective waves reflected by an object, thereby detecting the object and measuring a direction of and a distance from the object based on a change in received signals in response to transmitted signals. The radar technology has been developed for military and aviation purposes. Recently, the radar technology has been widely used in automobiles to proactively warn of and actively prevent and avoid automobile accidents.

Meanwhile, recently, an IR-UWB (impulse-radio ultra-wideband) technology has been introduced as an object tracking technology with high accuracy. That is because the IR-UWB technology uses impulses with very narrow widths from several nanoseconds to several hundreds of picoseconds and thus has characteristics strong against multiple paths with respect to signals in narrow bands.

With these characteristics of the IR-UWB technology, the research is being conducted to estimate a distance from a target object and improve accuracy of the estimation by using an IR-UWB device. Recently, the research is being actively conducted to not only estimate a distance between the target object and the IR-UWB device, but also accurately estimate a position of the target object, i.e., a coordinate of the target object on a two-dimensional plane. In order to accurately estimate the position of the target object, the trilateration may be used, in which at least three IR-UWB devices simultaneously measure the distance and use the distance values. However, in an actual situation in which noise is involved, errors occur while a radar system estimates a distance. As a result, the accuracy of the estimated position of the target object deteriorates if only the information about the estimated distance from the target object is used.

SUMMARY OF THE INVENTION

The present invention has been made in an effort to provide an apparatus and a method for tracking an object based on radar image reconstruction in order to improve the accuracy of estimation of a position of an object when tracking the object by using a multi-mode radar system.

An exemplary embodiment of the present invention provides an apparatus for tracking an object based on radar image reconstruction, the apparatus including a two-dimensional image producing unit configured to produce a two-dimensional image by collecting multiple one-dimensional radar signals from which clutter is removed, an object detecting unit configured to determine the presence or absence of an object from the two-dimensional image and estimate a two-dimensional position of the present object, and an object tracking unit configured to track a movement path of the object based on the two-dimensional position estimated by the object detecting unit.

An exemplary embodiment of the present invention provides a method of tracking an object based on radar image reconstruction, the method including producing a two-dimensional image by collecting multiple one-dimensional radar signals from which clutter is removed, determining the presence or absence of an object from the two-dimensional image and estimating a two-dimensional position of the present object, and tracking a movement path of the object based on the two-dimensional position estimated by the object detecting unit.

According to the object tracking based on the two-dimensional image restoration according to the present invention, the two-dimensional image is produced by collectively considering the pieces of information acquired from the multi-mode radar systems, and then the object is detected, and the object coordinate is estimated by using the two-dimensional image. As a result, it is possible to improve accuracy because the object is detected, and the coordinate is estimated by collectively considering more pieces of information in comparison with the related art.

DETAILED DESCRIPTION

Figure 1:
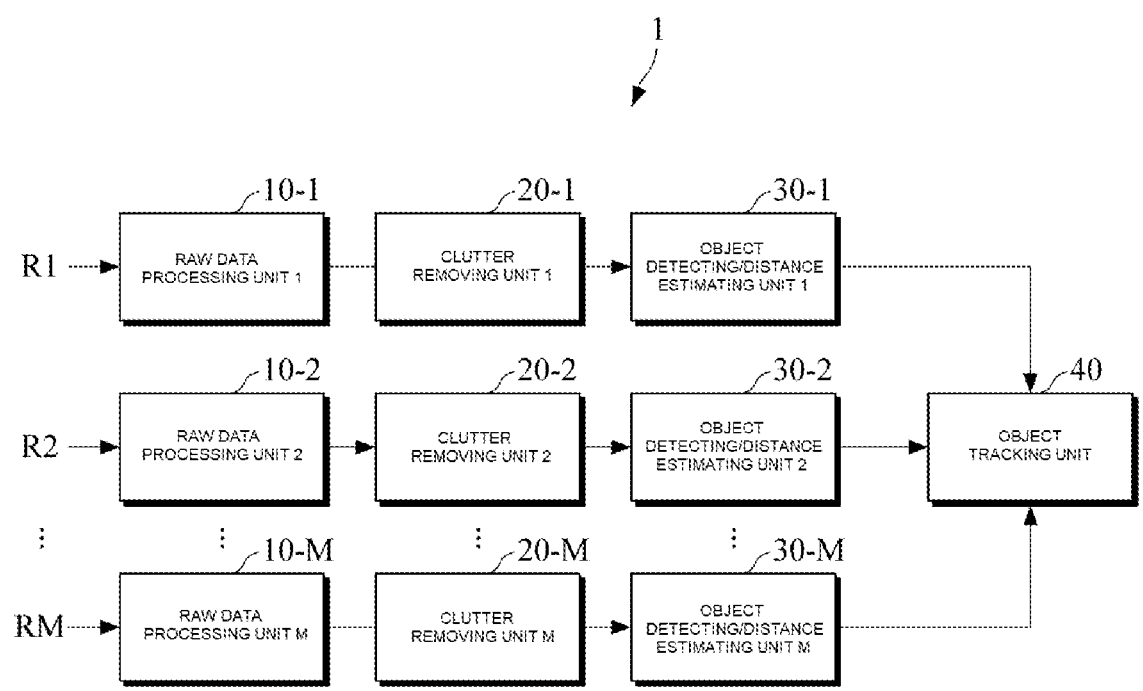
FIG. 1 is a block diagram for explaining a TOA-based object tracking apparatus using general radar.

An apparatus and a method for tracking an object based on radar image reconstruction according to exemplary embodiments will be described below in detail with reference to the accompanying drawings. Hereinafter, like reference numerals are used for like constituent elements, and repeated descriptions and detailed descriptions of publicly-known functions and configurations, which may unnecessarily obscure the subject matter of the present invention, will be omitted. The exemplary embodiments of the present invention are provided to more fully explain the present invention to those skilled in the art. Therefore, shapes and sizes of elements illustrated in the drawings may be exaggerated for a more apparent description.

Combinations of respective blocks of the attached block diagram and respective steps of the attached flow chart can be implemented by computer program instructions (processing engines). These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

Figure 2:
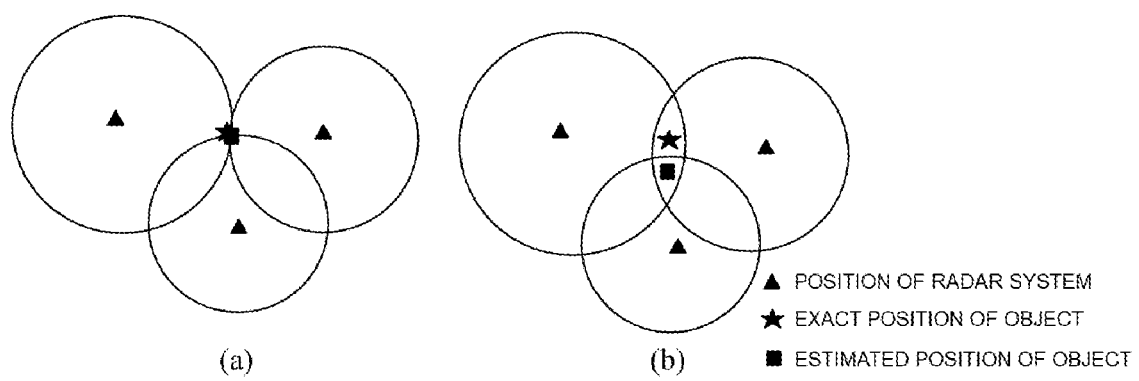
FIG. 2 is a view for explaining position detection (localization) with respect to TOA-based object tracking.

FIG. 1 is a block diagram for explaining a TOA-based object tracking apparatus using general radar, and FIG. 2 is a view for explaining position detection (localization) with respect to TOA-based object tracking.

Referring to FIG. 1, when multiple radar systems R1, R2, . . . , and RM transmit transmitting signals and receive reflective wave signals, the received reflective wave signals are used for processing processes, such as band pass filtering, noise removing, and envelope detection, by means of raw data processing units 10-1, 10-2, . . . , and 10-M corresponding to the received reflective wave signals, respectively.

The signals outputted from the raw data processing units 10-1, 10-2, . . . , and 10-M include radar signals reflected by a dynamic object, and clutter, i.e., radar signals reflected by a static object. Here, the clutter refers to unnecessary reflective waves in the received radar signals, i.e., a kind of reflective noise unnecessarily caused by ground surfaces, seawater, rainwater, obstacles, and obstructive radio waves at the background of the object.

Therefore, clutter removing units 20-1, 20-2, . . . , and 20-M estimate and remove the clutter from the radar signals received from the corresponding raw data processing units 10-1, 10-2, . . . , and 10-M.

Next, based on the signals from which the clutter is removed, object detecting/distance estimating units 30-1, 30-2, . . . , and 30-M detect the object to determine the presence or absence of the object, and estimate and calculate distances from the radar systems to the object. In this case, in order to estimate the distances, a TOA (time of arrival) method is mainly used to convert, into the distances, the time taken for the signals reflected by the object to reach the radar systems. That is, a method is used, which estimates the distances from the target object based on a time interval (time of arrival, hereinafter, referred to as TOA) between a point in time t0 at which the radar systems emit the radio waves and a point in time t1 at which the reflective waves reflected by the object are received. The distance from the object may be calculated by $t1-t0*c/2$, in which c is a transmission speed of the radio waves in the air.

FIG. 2 illustrates that the position of the object is estimated based on the signals acquired by the three radar systems. The respective circles of which the centers correspond to the two-dimensional positions of the radar systems have radii corresponding to the distances estimated by the object detecting/distance estimating units 30-1, 30-2, . . . , and 30-M.

Therefore, an object position detecting/tracking unit 40 tracks the two-dimensional position of the object based on the distances from the radar systems to the object which are estimated by the object detecting/distance estimating units 30-1, 30-2, . . . , and 30-M. As illustrated in FIG. 2A, the object position detecting/tracking unit 40 determines intersection points of the three circles as the two-dimensional position of the target object. FIG. 2A illustrates that the distances are ideally estimated by all of the radar systems, and the three circles intersect at a single point.

However, because errors occur during the distance estimation in an actual situation in which noise is involved, there is no point at which all of the three circles exactly overlap one another, as illustrated in FIG. 2B. For this reason, the estimated position of the object cannot be immediately calculated only based on the information about the estimated distances from the object. Therefore, the present invention provides a two-dimensional image producing technique in order to overcome the above-mentioned problem.

Figure 3:
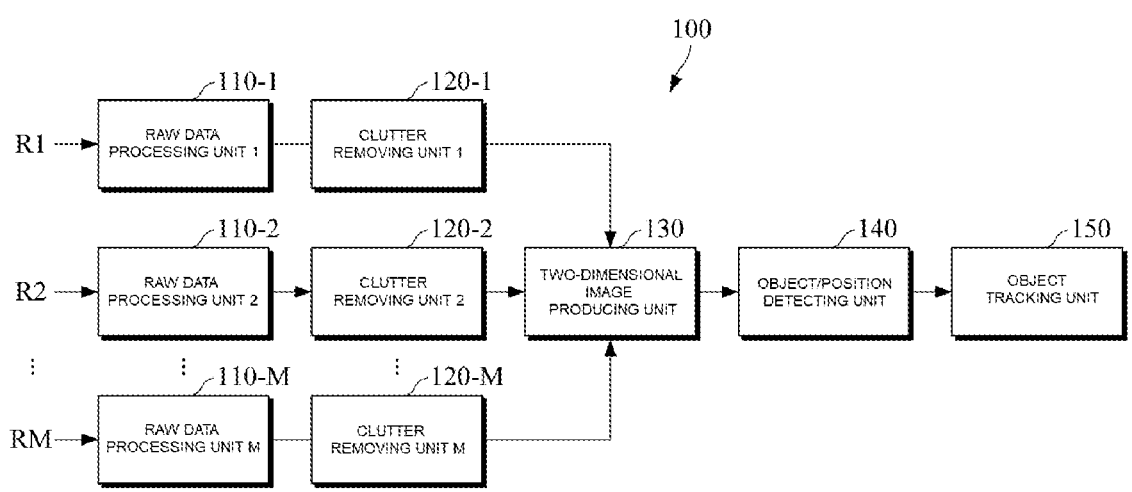
FIG. 3 is a block diagram of an apparatus for tracking an object based on radar image reconstruction according to an exemplary embodiment of the present invention.

FIG. 3 is a block diagram of an apparatus for tracking an object based on radar image reconstruction according to an exemplary embodiment of the present invention.

Referring to FIG. 3, the apparatus for tracking an object based on radar image reconstruction (hereinafter, referred to as an 'apparatus') includes multiple radar systems R1, R2, . . . , and RM, raw data processing units 110-1, 110-2, . . . , and 110-M, clutter removing units 120-1, 120-2, . . . , and 120-M, a two-dimensional image producing unit 130, an object detecting unit 140, and an object tracking unit 150.

Each of the multiple radar systems R1, R2, . . . , and RM may be an ultra-wideband (UWB) radar system that transmits ultra-wideband signals through a transmitting antenna, and receives, through a receiving antenna, reflective waves which are the transmitted ultra-wideband signals reflected by a dynamic object or a static object.

Each of the raw data processing units 110-1, 110-2, . . . , and 110-M performs raw data processing on the received signal acquired from each of the multiple multi-mode radar systems R1, R2, . . . , and RM and then outputs the signal. Here, the raw data processing performs processing processes, such as band pass filtering, noise removing, and envelope detection, on the received radar signals.

Each of the clutter removing units 120-1, 120-2, . . . , and 120-M estimates and removes the clutter, which is a radar signal reflected by a static object, i.e., the background such as a wall, from the one-dimensional radar signal outputted from each of the corresponding raw data processing units 110-1, 110-2, . . . , and 110-M. In this way, the signal outputted from each of the clutter removing units 120-1, 120-2, . . . , and 120-M may be a radar signal reflected by a dynamic object. In this case, in order to remove the clutter, various algorithms may be used in addition to an exponential averaging method or a clutter removing method based on a singular value decomposition.

The two-dimensional image producing unit 130 uses an image restoration technology and produces a two-dimensional image based on the one-dimensional radar signals outputted from the clutter removing units 120-1, 120-2, ..., and 120-M after the clutter is removed from the one-dimensional radar signals. The image restoration technology according to the exemplary embodiment needs to design a projection matrix in consideration of characteristics of sensors and to design a regularization term that reflects desired characteristics of the two-dimensional image to be restored. This method is more suitable for estimating a coordinate of the dynamic object because this method is advantageous in summing up pieces of information among the multiple sensors rather than performing the back-projection and this method provides characteristics strong against noise.

The two-dimensional image producing unit 130 calculates the two-dimensional image that minimizes an objective function designed by a vector made by summing up the radar signals from which the clutter is removed, and by a system matrix that reflects characteristics of the sensors of the radar systems. According to the exemplary embodiment, the objective function includes a regularization term that reflects prior information with respect to the two-dimensional image to be calculated. The detailed description regarding the design of the objective function will be described below with reference to Equations 1 to 7.

Based on the two-dimensional image produced by the two-dimensional image producing unit 130, the object detecting unit 140 detects the object to determine the presence or absence of the object and estimates a coordinate the present object. Here, the coordinate of the object on a two-dimensional plane may be estimated by using a thresholding technique. For example, the produced two-dimensional image may be expressed as a set of points present in a two-dimensional space, i.e., as a point cloud. Among the points that constitute the point cloud, only the points, which each have signal intensity equal to or higher than a predetermined threshold value, are selected, and the presence or absence of the object is determined based on the two-dimensional image formed by the selected points. When it is determined that the object is present, the object detecting unit 140 estimates the position of the corresponding object. According to the exemplary embodiment, a coordinate of a center of gravity of the two-dimensional image defining the corresponding object may be estimated as the position of the corresponding object.

Because the one-dimensional thresholding technique uses a single radar system, a lot of errors occur due to a great influence of noise when estimating the position. In contrast, in the present invention, a threshold value is determined based on many measured signals by using the two-dimensional image signals acquired by the multi-mode radar systems, such that the accuracy of the position estimation may be considerably improved.

The object tracking unit 150 tracks a movement path of the object based on the information about the position estimated by the object detecting unit 140. According to the exemplary embodiment, the two-dimensional coordinate is determined from the two-dimensional image by using at least one of a Kalman filter and a particle filter. The signals transmitted from the object detecting unit 140 are used to predict next data based on a model designed by at least one of the Kalman filter and the particle filter, and the correction is performed based on the predicted data when there is a great error between the actual data and the predicted data, thereby reducing the error.

Next, the design of the objective function used for the two-dimensional image producing unit 130 will be described in detail.

The restoration of the image from the one-dimensional data acquired from the radar systems for each frame may be expressed as Equation 1.

$$g_k = Hf_k + \eta \qquad \text{Equation 1}$$

In Equation 1, $g_k$ refers to a column stacked vector of an observed value of a $k^{th}$ frame acquired by the radar system, and $f_k$ refers to a column stacked vector of the two-dimensional image to be obtained. Further, H is a system matrix of the radar system, and $\eta$ refers to measured noise observed when measuring the radar signal. Here, the system matrix H shows a relationship between a position on a two-dimensional grid and mapping of a one-dimensional data point. According to the exemplary embodiment, the system matrix is designed depending on characteristics of the sensors of the radar systems. In particular, the system matrix is designed in consideration of signal attenuation and radiation patterns which are changed in accordance with a spatial coordinate.

In order to obtain $f_k$ from Equation 1, the objective function is designed, and optimum $f_k$ for minimizing the objective function is obtained. From Equation 1, the objective function may be expressed as Equation 2.

$$J(f_k) = \|g_k - Hf_k\| \qquad \text{Equation 2}$$

In Equation 2, $\|.\|$ means L2 norm, and $f_k$ for minimizing Equation 2 may be immediately obtained by using pseudo inverse. Because calculating a value from Equation 2 is based on a simple assumption that a magnitude of noise is small, the calculated value may be very vulnerable to noise. Therefore, according to the exemplary embodiment, a regularization technique is used which uses prior information about $f_k$ to be estimated based on Equation 3.

$$J(f_k) = \|g_k - Hf_k\| + R(f_k) \qquad \text{Equation 3}$$

According to the exemplary embodiment, the regularization term $R(f_k)$ of Equation 3 is designed by using two types of prior information and may be expressed as Equation 4. Here, in the exemplary embodiment for helping to understand the present invention, the two types of prior information for designing the regularization term $R(f_k)$ are described, for example, but the present invention is not limited thereto. That is, the number of pieces of prior information with respect to $f_k$ to be estimated in accordance with the present invention may be variously changed. In addition, according to the exemplary embodiment, the regularization term $R(f_k)$ may be designed depending on at least one of prior information representing that the two-dimensional image to be restored includes low-frequency elements and similarity between adjacent pixels has a predetermined reference value or more and prior information representing that similarity between the two-dimensional images restored from the two adjacent frames has a predetermined reference value or more due to a speed of sampling the radar frames. However, the present invention is not limited thereto, and the regularization term $R(f_k)$ may be designed depending on other prior information with respect to $f_k$ to be estimated.

$$R(f_k) = \beta_s R_s(f_k) + \beta_t R_t(f_k) \qquad \text{Equation 4}$$

In Equation 4, $R_s(f_k)$ refers to a regularization term on a spatial coordinate system, and $R_t(f_k)$ refers to a regularization term on a time axis. $\beta_s$ and $\beta_t$ are regularization parameters corresponding to the two regularization terms $R_s(f_k)$ and $R_t(f_k)$, respectively.

Hereinafter, as examples for defining the two regularization terms $R_s(f_k)$ and $R_t(f_k)$, Equation 5 and Equation 6 will be described. However, Equations 5 and 6 are just examples of the present invention, and the present invention is not limited thereto. According to the exemplary embodiment, $R_s(f_k)$ may refer to smoothness constraint and show prior information representing that there is no great high-frequency element in the restored image $f_k$, and there is no great difference in brightness between the adjacent pixels, that is, the similarity between the adjacent pixels has a predetermined reference value or more. That is, $g_k$ is the signal from which the clutter is removed. When the clutter is ideally removed, $f_k$ has a value, which is not '0', only in a region corresponding to the object, and $f_k$ has a value, which is '0', in a region out of the object. Therefore, in the entire image, the number of low-frequency components is large, and the number of high-frequency components is small. For example, $R_s(f_k)$ may be expressed as Equation 5.

$$R_s(f_k)=\mu\|W_h f_k\|^2+\|W_v f_k\|^2 \qquad \text{Equation 5}$$

Meanwhile, in Equation 4, $R_t(f_k)$ shows prior information representing that the speed of sampling the frames of the radar systems is sufficiently high, and thus there is no great difference between the images restored from the two adjacent frames, that is, the similarity between the two-dimensional images restored from the two adjacent frames has a predetermined reference value or more. Here, it is assumed that a difference between the two adjacent frames has a value of '0' in a region corresponding to the background instead of the object, and the difference has a value, which is not '0', in accordance with the movement amount of the object. For example, $R_t(f_k)$ may be defined as a difference between an image $f_{k-1}$ restored in the previous frame and an estimated value $f_k$ in the current frame and may be expressed as Equation 6.

$$R_t(f_k)=\|f_k - f_{k-1}\|^2 \qquad \text{Equation 6}$$

Finally, the two-dimensional image producing unit 130 obtains an estimated value for minimizing the objective function of Equation 3, which may be expressed as Equation 7.

$$f_k^* = \underset{f_x}{\operatorname{argmin}} J(f_k) \qquad \text{[Equation 7]}$$

Figure 4:
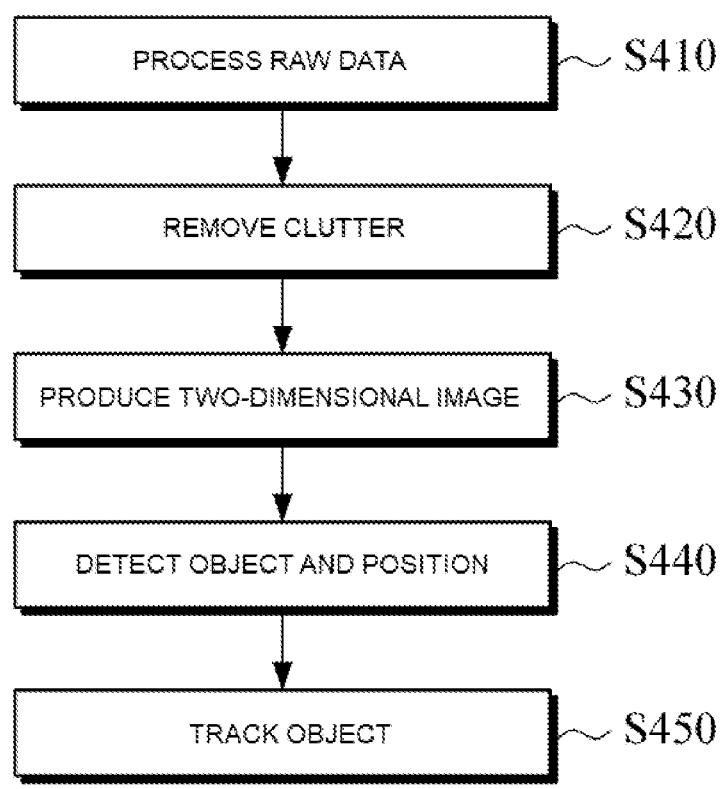
FIG. 4 is a flowchart for explaining a method of tracking an object based on radar image reconstruction according to another exemplary embodiment of the present invention.

FIG. 4 is a flowchart for explaining a method of tracking an object based on radar image reconstruction according to another exemplary embodiment of the present invention.

Referring to FIG. 4, an apparatus 100 performs the raw data processing on the received signals acquired from the multiple multi-mode radar systems R1, R2, . . . , and RM (S410). Here, the raw data processing performs processing processes, such as band pass filtering, noise removing, and envelope detection, on the received radar signals.

Next, the apparatus 100 estimates and removes the clutter, which is the radar signal reflected by a static object, the background such as a wall, from the one-dimensional radar signals (S420).

From the one-dimensional radar signals from which the clutter is removed, the apparatus 100 produces the two-dimensional image by using the image restoration technology (S430). That is, the apparatus 100 calculates the two-dimensional image that minimizes the objective function designed by the vector made by summing up the radar signals from which the clutter is removed, and by the system matrix that reflects characteristics of the sensors of the radar systems. According to the exemplary embodiment, the objective function includes the regularization term that reflects prior information with respect to the two-dimensional image to be calculated. The detailed description regarding the design of the objective function has been described above with reference to Equations 1 to 7.

Based on the produced two-dimensional image, the apparatus 100 detects the object to determine the presence or absence of the object and estimates the coordinate the present object (S440). Here, the coordinate of the object on the two-dimensional plane may be estimated by using the thresholding technique. For example, the produced two-dimensional image may be expressed as a set of points present in a two-dimensional space, i.e., as a point cloud. Among the points that constitute the point cloud, only the points, which each have signal intensity equal to or higher than a predetermined threshold value, are selected, and the presence or absence of the object is determined based on the two-dimensional image formed by the selected points. When it is determined that the object is present, the object detecting unit 140 estimates the position of the corresponding object. According to the exemplary embodiment, a coordinate of a center of gravity of the two-dimensional image defining the corresponding object may be estimated as the position of the corresponding object.

Because the one-dimensional thresholding technique uses a single radar system, a lot of errors occur due to a great influence of noise when estimating the position. In contrast, in the present invention, a threshold value is determined based on many measured signals by using the two-dimensional image signals acquired by the multi-mode radar systems, such that the accuracy of the position estimation may be considerably improved.

Finally, the apparatus 100 tracks a movement path of the object based on the information about the estimated position (S450).

What is claimed is:
1. An apparatus for tracking an object based on radar image reconstruction, the apparatus comprising:
 a two-dimensional image producing unit configured to produce a two-dimensional image by collecting multiple one-dimensional radar signals using sensors of a plurality of radars from each of which clutter is removed;
 an object detecting unit coupled to the two-dimensional image producing unit and configured to determine whether an object is present or absent from the two-dimensional image and estimate, in response to determining that the object is present, a two-dimensional position of the object; and
 an object tracking unit coupled to the object detecting unit and configured to track a movement path of the object based on the two-dimensional position estimated by the object detecting unit,
 wherein the two-dimensional image producing unit calculates the two-dimensional image that minimizes an objective function expressed using a vector made by stacking the multiple one-dimensional radar signals from which the clutter is removed, and a system matrix that reflects characteristics of the sensors of the plurality of radars collecting the multiple one-dimensional radar signals.
2. The apparatus of claim 1,
 wherein the objective function comprises a regularization term that reflects prior information with respect to the two-dimensional image to be calculated.
3. The apparatus of claim 2,
 wherein the regularization term depends on at least one of:

prior information representing that the two-dimensional image to be restored comprises low-frequency elements and similarity between adjacent pixels has a predetermined reference value; and prior information representing that similarity between two-dimensional images restored from two adjacent radar frames has a predetermined reference value due to a sampling speed of the two adjacent radar frames.

4. The apparatus of claim 1, wherein the object detecting unit is configured to estimate, in response to determining that the object is present, the two-dimensional position of the object using a time of arrival (TOA) method.

5. The apparatus of claim 1, wherein the objective function is expressed as follows:

$$J(f_k) = \|g_k - Hf_k\|,$$

where:
- k represents an index of a frame acquired by a radar system;
- $f_k$ represents a column stacked vector of the two-dimensional image to be obtained;
- $g_k$ represents a column stacked vector of an observed value of a kth frame acquired by the radar system; and
- H represents the system matrix that reflects characteristics of sensors of a plurality of radars.

6. A method of tracking an object based on radar image reconstruction, the method comprising:

producing a two-dimensional image by collecting multiple one-dimensional radar signals from each of which clutter is removed;

determining whether an object is present or absent from the two-dimensional image and estimating, in response to determining that the object is present, a two-dimensional position of the object; and tracking a movement path of the object based on the two-dimensional position estimated by the object detecting unit, wherein the producing of the two-dimensional image comprises calculating the two-dimensional image that minimizes an objective function expressed using a vector made by stacking the multiple one-dimensional radar signals from each of which the clutter is removed, and a system matrix that reflects characteristics of sensors of a plurality of radars.

7. The method of claim 6, wherein the objective function comprises a regularization term that reflects prior information with respect to the two-dimensional image to be calculated.

8. The method of claim 7, wherein the regularization term depends on at least one of:

prior information representing that the two-dimensional image to be restored comprises low-frequency elements and similarity between adjacent pixels has a predetermined reference value; and prior information representing that similarity between two-dimensional images restored from two adjacent radar frames has a predetermined reference value due to a sampling speed of the two adjacent radar frames.

* * * * *